M. GUETT.
FLEXIBLE CONDUIT FASTENER.
APPLICATION FILED SEPT. 26, 1914.
1,178,150.
Patented Apr. 4, 1916.
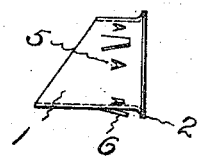
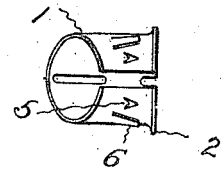
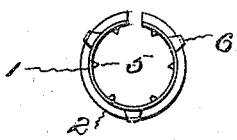
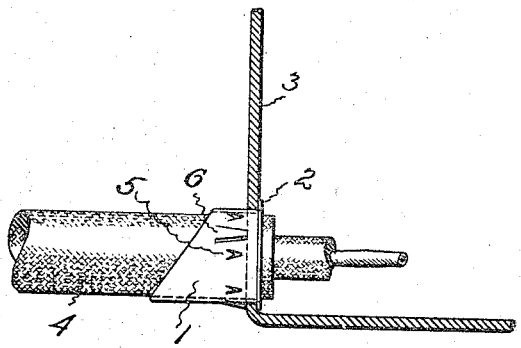

UNITED STATES PATENT OFFICE.

MONROE GUETT, OF HARTFORD, CONNECTICUT, ASSIGNOR TO THE HART & HEGEMAN MANUFACTURING COMPANY, OF HARTFORD, CONNECTICUT, A CORPORATION OF CONNECTICUT.

FLEXIBLE-CONDUIT FASTENER.

1,178,150.  Specification of Letters Patent.  Patented Apr. 4, 1916.

Application filed September 26, 1914. Serial No. 863,639.

*To all whom it may concern:*

Be it known that I, MONROE GUETT, a citizen of the United States, residing at Hartford, in the county of Hartford and State of Connecticut, have invented a new and useful Improvement in Flexible-Conduit Fasteners, of which the following is a specification.

It is more or less difficult to bend and thrust through the proper opening in an outlet box flexible conduit for electric wires of the kind known as "loom," and when entered it quite frequently happens that after a time the end of such conduit, if too short, pulls out of the box, or if too long, works into the box and occupies needed space.

This invention relates to a tip which is designed to be fastened to the end of a piece of flexible conduit of "loom" type for the purpose of forming a neat end for the conduit and for holding that end in the desired relation to the outlet box with which it is connected.

The object of the invention is to provide a tip of this character which is very simple to make and easy to apply so that it will grip the end of a piece of conduit, which is readily thrust through an opening in the outlet box, and when so thrust automatically fastens itself in the opening so as to hold the end of the conduit in the desired position.

Figure 1 of the accompanying drawings shows a side elevation of a flexible conduit fastener or tip which embodies this invention. Fig. 2 shows a top view of the same. Fig. 3 shows an end view. Fig. 4 illustrates one of these tips being used for fastening the end of a piece of conduit to the wall of an outlet box.

The fastener is preferably made of thin sheet steel in the form of a cylinder 1 that is slitted along one side so that it may be opened and sprung onto the end of a piece of conduit. The base or inner end of this cylinder is provided with a flange 2 that is somewhat larger in diameter than the hole through which the fastener is to be thrust. The other end of this cylinder is preferably cut obliquely so that it may be more easily worked down and thrust through the opening in the outlet box 3, when it is on the end of a piece of conduit 4. The cylinder is preferably slitted along the short side. When the steel blank for this cylinder is shaped pointed teeth 5 are formed so that they will project inwardly and stick into the surface of the conduit on which the fastener is sprung. These teeth are arranged in such manner that they will allow the fastener to be slipped onto the end of the conduit but not pulled therefrom. Tongues 6 are stamped from the blank so that they will spring outwardly from the fastener. These tongues extend in such manner and their free ends terminate in such a position that when the fastener is thrust through the opening in an outlet box and the flange on the inner end is against the inner wall of the box, the tongues will spring out and engage the outer wall of the box and thus hold the fastener in position, and, of course, as the teeth project down into the conduit the end of the conduit is firmly held in place. As the cylinder which forms the fastener is slitted along one side it is easily spread open and closed upon conduit of different diameters.

The invention claimed is:—

1. A conduit fastener comprising an integral cylinder that is slitted along one side only and has an outwardly extending flange at one end, outwardly extending tongues projecting toward said flange and adapted to coöperate therewith in holding the fastener to the wall of an outlet box, and inwardly extending teeth projecting in the same direction as the tongues.

2. A conduit fastener comprising a cylinder that is slitted along one side, has an outwardly extending flange at one end and that is cut obliquely at the other end, with teeth projecting inwardly toward the flanged end of the cylinder, and tongues projecting outwardly toward the flange.

3. A conduit fastener comprising a cylinder that is longer on one side than the other and that has its shorter side slitted, said cylinder having an outwardly extending flange at one end, teeth projecting inwardly toward the flanged end of the cylinder, and tongues extending outwardly and opposing the flange.

MONROE GUETT.

Witnesses:
M. BFIL,
A. J. BENNETT.